3,303,192
1 - HALOPHENYL - 3 - ALKYL - 5 - (SUBSTITUTED-
THIO) - 6 - AMINO - 1,2,3,4 - TETRAHYDROPY-
RIMIDINE - 2,4 - DIONES AND INTERMEDIATES
THEREFOR
Elmer F. Schroeder, Chicago, Ill., assignor to G. D. Searle
  & Co., Chicago, Ill., a corporation of Delaware
No Drawing. Filed July 19, 1965, Ser. No. 473,156
12 Claims. (Cl. 260—243)

This application is a continuation-in-part of Serial No. 401,705, filed October 5, 1964.

The present invention relates to novel tetrahydro-primidine-2,4-diones characterized by halophenyl substituent at the 1-position and, in particular, to 1-halophenyl-3-alkyl-5-(substituted - thio) - 6 - amino - 1,2,3,4 - tetrahydropyrimidine - 2,4 - diones which can be illustrated by the following structural formula

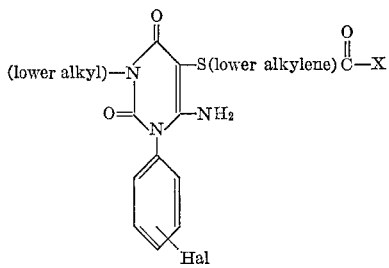

In that structural representation, X can be a hydroxy, amino, (lower alkyl)amino, (lower alkenyl)amino, or hydroxy(lower alkyl)amino radical.

Examples of the lower alkyl radicals depicted in the foregoing formula are methyl, ethyl, propyl, butyl, pentyl, hexyl, heptyl, and the branched-chain radicals isomeric therewith. The lower alkenyl radicals therein represented are exemplified by allyl, crotyl, propenyl, butenyl, pentenyl, isopropenyl, etc. The substituent represented as Hal encompasses the members of the halogen family, i.e. fluorine, chlorine, bromine, and iodine. The lower alkylene radicals symbolized above are typified by methylene, ethylene, trimethylene, tetramethylene, pentamethylene and the branched-chain radicals isomeric therewith.

The compounds of the present invention are conveniently obtained by utilizing as starting materials those substances represented by the following structural formula

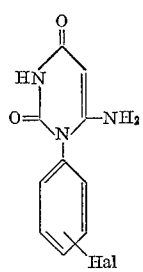

wherein Hal is as hereinbefore defined. Alkylation of those substances, suitably with a lower alkyl halide or dialkyl sulfate, preferably in the presence of an acid acceptor such as sodium hydroxide, pyridine, or triethylamine, affords the corresponding 3-alkyl compounds. The compounds so produced are then halogenated at the 5-position, preferably with chlorine or bromine, to yield the corresponding 5-halo derivatives. The latter substances are contacted with the appropriate mercaptocarboxylic acid to yield the corresponding 5-carboxyalkylthio substances. Cyclodehydration of those compounds, typically with a reagent such as acetic anhydride, sulfuric acid, hydrogen chloride or sulfonyl chloride, produces the corresponding bicyclic 5,7-disubstituted 3,6,8 - triketopyrimido[5,4 - b]1,4 - thiazines. The 5-carbamoyl compounds of this invention are produced by contacting the latter bicyclic intermediates with the appropriate amine, suitably at room temperature.

The above described processes are typified by the following specific examples. Thus, 1-p-chlorophenyl-6-amino-1,2,3,4-tetrahydropyrimidine-2,4-dione is alkylated by heating with dimethyl sulfate in an aqueous alkaline medium to afford 1-p-chlorophenyl-3-methyl-6-amino-1,2,3,4-tetrahydropyrimidine - 2,4 - dione. Halogenation of the latter product with chlorine in carbon tetrachloride at room temperature affords 1-p-chlorophenyl-3-methyl-5-chloro-6-amino-1,2,3,4-tetrahydropyrimidine-2,4 - dione. Reaction of that substance with mercaptoacetic acid in aqueous propanolic sodium hydroxide at the reflux temperature produces 1-p-chlorophenyl-3-methyl-5-carboxymethylthio - 6 - amino - 1,2,3,4 - tetrahydropyrimidine-2,4-dione. That thioacid is then cyclodehydrated by heating with acetic anhydride at steam bath temperature, thus affording 5-p-chlorophenyl-7-methyl-3,6,8-triketopyrimido[5,4-b]1,4-thiazine. The latter bicyclic intermediate is contacted with 2-hydroxyethylamine to afford the desired 1-p-chlorophenyl-3-methyl-5-(N-2-hydroxyethylcarbamoylmethylthio) - 6 - amino-1,2,3,4-tetrahydropyrimidine-2,4-dione.

The 5-(substituted-thio) compounds of the present invention are useful as a result of their valuable pharmacological properties. They possess anti-inflammatory activity, for example, as is evidenced by their ability to inhibit the local edema formation characteristic of inflammatory states. They are also hypocholesterolemic agents in view of their capacity for lowering blood plasma cholesterol levels. In addition, the instant compounds are pepsin inhibitors and also anti-ulcerogenic agents as a result of their capability for inhibiting ulcer formation.

The invention will appear more fully from the examples which follow. These examples are given by way of illustration only, however, and are not to be construed as limiting the invention either in spirit or in scope as many modifications both in materials and methods will be apparent from these examples to those skilled in the art. In the following examples, temperatures are given in degrees centigrade (° C.), and quantities of materials are expressed in parts by weight except where otherwise noted.

*Example 1*

A mixture of 23.8 parts of 1-p-chlorophenyl-6-amino-1,2,3,4-tetrahydropyrimidine-2,4-dione, 8 parts of sodium hydroxide and 240 parts of water is heated to approximately 60° in order to effect solution, at which time 17.3 parts of dimethyl sulfate is added dropwise over a period of about 10 minutes. The resulting reaction mixture is heated at 70–75° for about 15 minutes, then is allowed to cool for several hours. The precipitated solid which forms is collected by filtration, washed on the filter with water and dried in air. Purification by recrystallization from ethanol affords colorless crystals of 1-p-chlorophenyl - 3 - methyl-6-amino-1,2,3,4-tetrahydropyrimidine-2,4-dione, melting at about 284–285°.

*Example 2*

To a stirred mixture of 25.2 parts of 1-p-chlorophenyl-3 - methyl - 6-amino-1,2,3,4-tetrahydropyrimidine-2,4-dione, 9.24 parts of sodium bicarbonate and 320 parts of methanol is added gradually, over a period of about 15 minutes, 16 parts of liquid bromine. The resulting reaction mixture is stirred at room temperature for about 30 minutes longer, then is allowed to cool at 0–5° for several hours. The precipitate which forms during that cooling period is separated by filtration, then is slurried with water, separated by filtration and finally allowed to dry in air. The resulting crude product is purified by recrystallization from ethanol to yield 1-p-chlorophenyl-3 - methyl-5-bromo-6-amino-1,2,3,4-tetrahydropyrimidine-2,4-dione, which melts at about 227–228° with effervescence.

*Example 3*

To a mixture of 25.2 parts of 1-p-chlorophenyl-3-methyl - 6-amino-1,2,3,4-tetrahydropyrimidine-2,4-dione, 9.24 parts of sodium bicarbonate and 325 parts of methanol is added over a period of about 40 minutes, with stirring, an ice cold solution of 7.1 parts of chlorine in 96 parts of carbon tetrachloride. The resulting reaction mixture is stirred at room temperature for approximately 30 minutes, then is filtered in order to remove inorganic salts. The filtrate remaining is partially concentrated by distillation under reduced pressure, then is cooled and allowed to stand at room temperature for several hours. The resulting solid product is collected by filtration, washed thoroughly on the filter with water and purified by recrystallization from ethanol, thus affording colorless crystals of 1-p-chlorophenyl-3-methyl-5-chloro-6-amino-1,2,3,4-tetrahydropyrimidine-2,4-dione, melting at about 257–259°.

*Example 4*

A mixture of 17.2 parts of 1-p-chlorophenyl-3-methyl-5 - chloro - 6-amino-1,2,3,4-tetrahydropyrimidine-2,4-dione, 68 parts of water, 24 parts of propyl alcohol, 5.8 parts of sodium hydroxide and 6.1 parts of mercaptoacetic acid is heated at the reflux temperature for about one hour, then is stripped of solvent by distillation under reduced pressure. The residual mixture is then diluted with water, allowed to stand at room temperature for about 16 hours and finally filtered in order to remove a small quantity of insoluble material. Acidification of the resulting filtrate with hydrochloric acid results in the separation of an initially gummy material which readily solidifies upon standing to afford 1-p-chlorophenyl-3-methyl - 5-carboxymethylthio-6-amino-1,2,3,4-tetrahydropyrimidine-2,4-dione as a colorless solid, melting at about 233–235°.

*Example 5*

A mixture of 6.84 parts of 1-p-chlorophenyl-3-methyl-5 - carboxymethylthio - 6-amino-1,2,3,4-tetrahydropyrimidine-2,4-dione and 28 parts of acetic anhydride is heated on the steam bath for about 4 hours, then is cooled to room temperature and diluted with approximately 100 parts of water in order to decompose excess acetic anhydride. The solid precipitate which forms is collected by filtration, washed on the filter with water, then slurried with aqueous sodium bicarbonate in order to remove any unreacted starting material. The slurry is then filtered, and the thus isolated crude product is washed on the filter with water, then dried to afford pure 5-p-chlorophenyl - 7 - methyl - 3,6,8-triketopyrimido[5,4-b]1,4-thiazine, melting at about 301–303° with effervescence.

*Example 6*

A mixture of 2 parts of 5-p-chlorophenyl-7-methyl-3,6,8-triketopyrimido[5,4-b]1,4-thiazine, 2.2 parts of propylamine and 9 parts of water is allowed to stand at room temperature for about 5 days, during which time the starting material gradually dissolves and the product separates as a precipitate. At the end of the reaction period, the mixture is diluted with approximately 10 parts of water, and the resulting precipitate is collected by filtration, then washed on the filter with water and finally dried in air. Recrystallization of that crude product from ethanol results in 1-p-chlorophenyl-3-methyl-5-(N-propylcarbamoylmethylthio) - 6 - amino-1,2,3,4-tetrahydropyrimidine-2,4-dione as a colorless solid melting at about 207–209°.

This compound is illustrated by the following structural formula

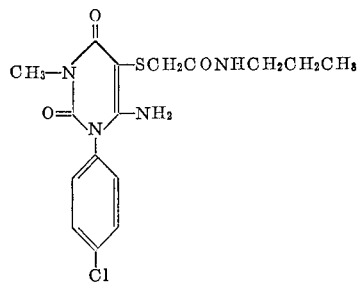

*Example 7*

A mixture of 2 parts of 5-p-chlorophenyl-7-methyl-3,6,8-triketopyrimido[5,4-b]1,4-thiazine, 9 parts by volume of 30% aqueous methylamine and 3 parts of water is kept at room temperature, with occasional shaking, for about 5 days. At the end of that time, the reaction mixture is diluted with approximately 10 parts of water, and the precipitate which forms is collected by filtration. Washing of that crude product with water followed by drying affords the crude product, which is purified by recrystallization from ethanol, thus producing 1-p-chlorophenyl-3-methyl - 5 - (N-methylcarbamoylmethylthio)-6-amino-1,2,3,4-tetrahydropyrimidine-2,4-dione as a colorless solid, melting at about 214–216° C. It can be represented by the following structural formula

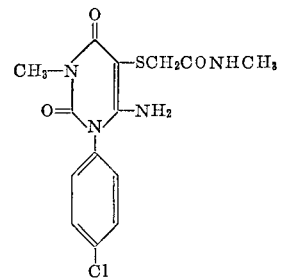

*Example 8*

A two-phase system consisting of 2 parts of 5-p-chlorophenyl-7-methyl-3,6,8-triketopyrimido[5,4-b]1,4 - thiazine and 10.8 parts of concentrated ammonium hydroxide is allowed to stand at room temperature for about 5 days, during which time the mixture is occasionally shaken. The initial solid phase gradually disappears, giving way to a new precipitate. At the end of the reaction period, approximately 10 parts of water is added, and the insoluble product is collected by filtration, then washed with water. Drying of that material in air affords pure 1-p-chlorophenyl-3-methyl-5-carbamoylmethylthio - 6-amino-1,2,3,4-tetrahydropyrimidine-2,4-dione as a colorless solid, melting at about 205–207° with effervescence. Recrystallization of that material from ethanol does not affect the melting point. This compound is characterized further by the following structural formula

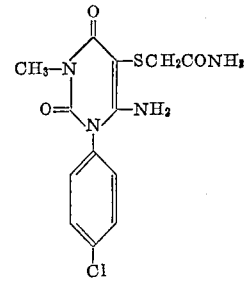

*Example 9*

A heterogeneous mixture containing 4 parts of 5-p-chlorophenyl-7-methyl-3,6,8-triketopyrimido[5,4 - b]1,4- thiazine, 3.5 parts of allylamine and 20 parts of water is heated to approximately 50° for about 5 minutes, then is allowed to stand at room temperature for about 4 days. At the end of that time, the product has partially precipitated. Dilution of the reaction mixture with approximately 25 parts of water results in further precipitation of the crude product. That material is collected by filtration and washed on the filter with water, then dried. Purification of that crude product by recrystallization from ethanol yields pure 1-p-chlorophenyl-3-methyl-5-(N-allylcarbamoylmethylthio)-6-amino - 1,2,3,4 - tetrahydropyrimidine-2,4-dione as a colorless solid, melting at about 197–199°. Its structural formula is shown below.

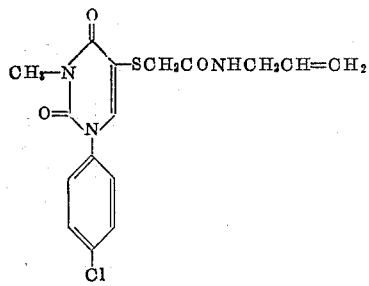

Example 10

A mixture of 4 parts of 5-p-chlorophenyl-7-methyl-3,6,8-triketopyrimido[5,4-b]1,4-thiazine, 4.5 parts of 2-hydroxyethylamine and 20 parts of water is heated to about 60° for approximately 30 minutes, during which time the majority of the starting material dissolves. Storage of that reaction mixture at room temperature for about 4 days followed by dilution with approximately 20 parts of water results in precipitation of the crude product, which is separated by filtration, then washed on the filter with water and dried. The crude product thus obtained is purified by recrystallization from ethanol to produce, as colorless crystals, 1-p-chlorophenyl-3-methyl-5-(N - 2 - hydroxyethylcarbamoylmethylthio)-6-amino-1,2,3,4-tetrahydropyrimidine-2,4-dione, which exhibits a melting point at about 213–215°. This compound is represented by the following structural formula

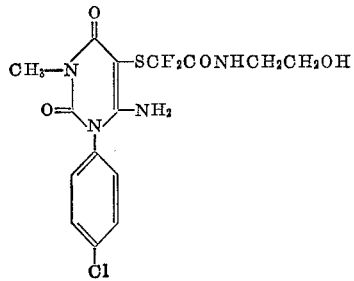

Example 11

A mixture containing 3.5 parts of 5-p-chlorophenyl-7-methyl-3,6,8-triketopyrimido[5,4-b]1,4-thiazine, 3.3 parts of isobutylamine, 17 parts of water and 4 parts of ethanol is heated at approximately 50° for about 30 minutes, during which time the mixture becomes homogeneous and an oily layer containing the product forms. The reaction mixture is allowed to stand at room temperature for about 5 days with occasional stirring, during which time the initially formed oily layer solidifies. At the end of the reaction period, the solid product is collected by filtration, washed with water and dried in air. Recrystallization of that substance from a mixture of ethyl acetate and hexane results in pure 1-p-chlorophenyl-3-methyl-5-(N-isobutylcarbamoylmethylthio) - 6 - amino - 1,2,3,4 - tetrahydropyrimidine-2,4-dione, melting at about 170–172° and characterized further by the following structural formula

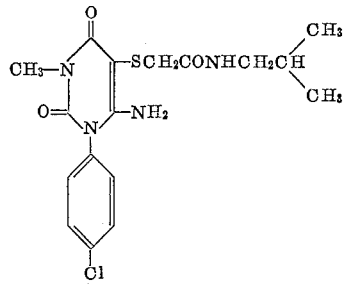

Example 12

The reaction of equivalent quantities of 1-m-chlorophenyl - 6 - amino - 1,2,3,4 - tetrahydropyrimidine - 2,4-dione with diethyl sulfate according to the procedure of Example 1 results in 1-m-chlorophenyl-3-ethyl-6-amino-1,2,3,4-tetrahydropyrimidine-2,4-dione.

Example 13

By substituting an equivalent quantity of 1-m-chlorophenyl - 3 - ethyl - 6 - amino - 1,2,3,4-tetrahydropyrimidine-2,4-dione and otherwise proceedinig according to the process described in Example 3, there is obtained 1-m-chlorophenyl - 3 - ethyl - 5 - chloro-6-amino-1,2,3,4-tetrahydropyrimidine-2,4-dione.

Example 14

When an equivalent quantity of 1-m-chlorophenyl-3-ethyl - 5 - chloro - 6 - amino - 1,2,3,4 - tetrahydropyrimidine-2,4-dione is substituted in the procedure of Example 4, there is obtained 1-m-chlorophenyl-3-ethyl-5-carboxymethylthio - 6 - amino - 1,2,3,4-tetrahydropyrimidine-2,4-dione.

Example 15

The substitution of an equivalent quantity of 1-m-chlorophenyl - 3 - ethyl - 5 - carboxymethylthio-6-amino-1,2,3,4-tetrahydropyrimidine-2,4-dione in the procedure of Example 5 results in 5-m-chlorophenyl - 7 - ethyl - 3,6,8-triketopyrimido[5,4-b]1,4-thiazine.

Example 16

The substitution of an equivalent quantity of 5-m-chlorophenyl - 7 - ethyl - 3,6,8 - triketopypyrimido [5,4-b]-1,4-thiazine in the procedure of Example 8 results in 1-m-chlorophenyl - 3 - ethyl - 5 - carbamoylmethylthio - 6-amino-1,2,3,4-tetrahydropyrimidine-2,4-dione.

Example 17

Where an equivalent quantity of ethylamine is substituted in the procedure of Example 7, 1-p-chlorophenyl-3-methyl - 5 - (N - ethylcarbamoylmethylthio) - 6 - amino-1,2,3,4-tetrahydropyrimidine-2,4-dione is produced.

Example 18

The substitution of an equivalent quantity of crotylamine in the procedure of Example 9 results in 1-p-chlorophenyl - 3 - methyl - 5 - (N - crotylcarbamoylmethylthio) - 6-amino-1,2,3,4-tetrahydropyrimidine-2,4-dione.

Example 19

When an equivalent quantity of 3-hydroxypropylamine is substituted in the procedure of Example 10, there is obtained 1 - p - chlorophenyl - 3 - methyl - 5 - (N - 3 - hydroxypropylcarbamoylmethylthio) - 6 - amino - 1,2,3,4- tetrahydropyrimidine-2,4-dione.

What is claimed is:
1. A compound of the formula

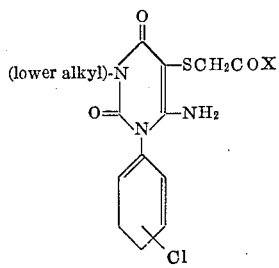

wherein X is selected from the group of radicals consisting of hydroxy, amino, (lower alkyl)amino, (lower alkenyl)amino and hydroxy(lower alkyl)amino.

2. 1 - (p - chlorophenyl) - 3 - methyl - 5 - carboxymethylthio - 6 - amino - 1,2,3,4 - tetrahydropyrimidine-2,4-dione.

3. 1 - (p - chlorophenyl) - 3 - methyl - 5 - carbamoylmethylthio - 6 - amino-1,2,3,4-tetrahydropyrimidine - 2,4-dione.

4. 1 - p - chlorophenyl - 3 - methyl - 5 - (N - methylcarbamoylmethylthio) - 6 - amino - 1,2,3,4 - tetrahydropyrimidine-2,4-dione.

5. 1 - p-chlorophenyl - 3 - methyl - 5 - (N - propylcarbamoylmethylthio) - 6 - amino - 1,2,3,4 - tetrahydropyrimidine-2,4-dione.

6. 1 - p - chlorophenyl - 3 - methyl - 5 - (N - isobutylcarbamoylmethylthio) - 6 - amino - 1,2,3,4 - tetrahydropyrimidine-2,4-dione.

7. 1 - p - chlorophenyl - 3 - methyl - 5 - (N - allylcarbamoylmethylthio) - 6 - amino - 1,2,3,4 - tetrahydropyrimidine-2,4-dione.

8. 1 - p - chlorophenyl - 3 - methyl - 5 - (N - hydroxyethylcarbamoylmethylthio) - 6 - amino - 1,2,3,4 - tetrahydropyrimidine-2,4-dione.

9. A compound of the formula

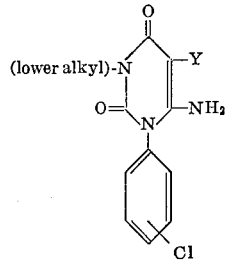

wherein Z is a halogen substituent selected from the group consisting of chloro and bromo.

10. 1 - p - chlorophenyl - 3 - methyl - 5 - bromo - 6 - amino - 1,2,3,4-tetrahydropyrimidine-2,4-dione.

11. 1 - p - chlorophenyl - 3 - methyl - 5 - chloro - 6 - amino-1,2,3,4-tetrahydropyrimidine-2,4-dione.

12. 5 - p - chlorophenyl - 7 - methyl - 3,6,8 - triketopyrimido[5,4-b]1,4-thiazine.

References Cited by the Examiner
UNITED STATES PATENTS

| | | | |
|---|---|---|---|
| 2,650,922 | 9/1953 | Papesch et al. | 260—256.4 |
| 2,731,465 | 1/1956 | Schroeder | 260—256.4 |
| 3,080,364 | 3/1963 | Schroeder | 260—243 |
| 3,080,370 | 3/1963 | Schroeder | 260—256.5 |

ALEX MAZEL, *Primary Examiner.*

MARY O'BRIEN, *Assistant Examiner.*

UNITED STATES PATENT OFFICE
CERTIFICATE OF CORRECTION

Patent No. 3,303,192                February 7, 1967

Elmer F. Schroeder

It is hereby certified that error appears in the above numbered patent requiring correction and that the said Letters Patent should read as corrected below.

Column 3, line 12, for "325" read -- 320 --; column 7, lines 3 to 14, the lower portion of the formula should appear as shown below instead of as in the patent:

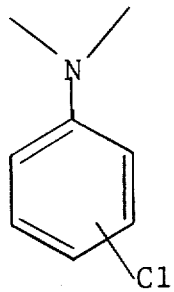

column 8, lines 4 to 15, the upper portion of the formula should appear as shown below instead of as in the patent:

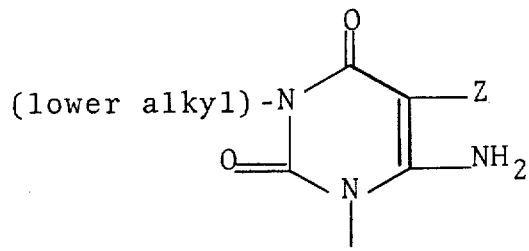

Signed and sealed this 28th day of November 1967.

(SEAL)
Attest:

EDWARD M. FLETCHER, JR.              EDWARD J. BRENNER
Attesting Officer                   Commissioner of Patents